United States Patent [19]

Nakayama et al.

[11] Patent Number: 5,066,861
[45] Date of Patent: Nov. 19, 1991

[54] X RAY DETECTING DEVICE

[75] Inventors: Takehisa Nakayama; Akimine Hayashi; Masataka Kondo; Satoru Murakami; Minori Yamaguchi; Yoshihisa Tawada; Masahiko Hosomi, all of Hyogo, Japan

[73] Assignee: Kanegafuchi Chemical Industry Co., Ltd., Osaka, Japan

[21] Appl. No.: 299,103

[22] Filed: Jan. 19, 1989

[30] Foreign Application Priority Data

| Jul. 22, 1987 | [JP] | Japan | 62-184056 |
| Aug. 7, 1987 | [JP] | Japan | 62-198377 |
| Aug. 7, 1987 | [JP] | Japan | 62-198378 |
| Oct. 28, 1987 | [JP] | Japan | 62-272640 |
| Oct. 28, 1987 | [JP] | Japan | 62-272641 |
| Oct. 28, 1987 | [JP] | Japan | 62-272642 |

[51] Int. Cl.$^5$ .............................................. G01T 1/20
[52] U.S. Cl. .............................. 250/370.09; 250/370.11; 250/370.14
[58] Field of Search ............ 250/370.07, 370.08, 250/370.09, 370.10, 370.11, 370.14, 371, 370; 378/97, 108, 185, 182; 357/29

[56] References Cited

U.S. PATENT DOCUMENTS

| 3,857,040 | 12/1974 | Zwettler et al. | 378/186 |
| 3,932,756 | 1/1976 | Cowell et al. | 250/370.11 |
| 4,146,904 | 3/1979 | Baertsch et al. | 250/370.11 |
| 4,403,150 | 9/1983 | Kurihara et al. | 250/370.07 |
| 4,444,484 | 4/1984 | Best et al. | 378/182 X |
| 4,547,670 | 10/1985 | Sugimoto et al. | 250/370.13 |
| 4,554,453 | 11/1985 | Feigt et al. | 250/370.11 |
| 4,672,454 | 6/1987 | Cannella et al. | 250/370.09 X |
| 4,675,739 | 6/1987 | Catchpole et al. | 250/370.09 X |
| 4,689,487 | 8/1987 | Nishiki et al. | 250/361 R |
| 4,734,588 | 3/1988 | Akai | 250/370.09 |
| 4,785,186 | 11/1988 | Street et al. | 250/370.14 |
| 4,845,363 | 7/1989 | Akai | 250/368 |
| 4,926,052 | 5/1990 | Hatayama et al. | 250/370.14 |

FOREIGN PATENT DOCUMENTS

| 55-99085 | 7/1980 | Japan | 250/370.07 |
| 1-126583 | 5/1989 | Japan | 250/370.09 |

Primary Examiner—Constantine Hannaher
Assistant Examiner—Edward J. Glick
Attorney, Agent, or Firm—Wegner, Cantor, Mueller & Player

[57] ABSTRACT

In an X ray detecting device comprising XL converting unit for converting the X rays into visible light corresponding to the intensity of the X rays and a LE converting unit for converting the visible light into an electrical signal corresponding to the intensity of the visible light, the base layer of the LE converting unit is formed of a material such that the base layer does not substantially absorb the X rays so that the image of the LE converting unit does not appear on the picture of the object.

23 Claims, 7 Drawing Sheets

X RAY DETECTING DEVICE

BACKGROUND OF THE INVENTION

1. Field of the Invention

The present invention relates to an X ray detecting device using a semiconductor device.

2. Description of the Prior Art

In a roentgen diagonal device for taking a radioscopy picture of a patient, there is used an X ray detecting device for measuring the intensity of the X rays to control the intensity of the X ray radiation from an X ray source. The X ray detecting device mentioned above is usually disposed between the X ray source and the patient.

There has been proposed such an X ray detecting device comprising an X ray to light converting unit (referred to as an XL converter) for converting the incident X rays into visible light and a light to electric converting unit (LE converter) for converting the visible light into an electric signal, so that the intensity of the X rays can be measured by the electric signal. In the conventional X ray detecting device of the above type, the LE converter is formed by using a base plate made of glass or metal. The X rays passing the X ray detecting device are attenuated by the base plate made of glass or metal, whereby the amount of the X rays to be radiated on the patient decreases and an unnecessary image of the base plate of the LE converter appears on the radiography of the patient and therefore a clear patient's radiography cannot be obtained. In order to prevent the appearance of the image of the base plate of the LE converter on the radiography in the conventional device, it is necessary to use a large X ray detecting device having a large LE converter which is larger than the object to be radiographed. In order to accomplish this purpose, if there is provided a large X ray detecting device, it is unreasonable to use the large size X ray converter having a large size LE converter to radiograph a relatively small sized object. In addition the large size LE converter causes the weight of the X ray detection device to be heavy and the operability of the X ray detection device becomes deteriorated.

SUMMARY OF THE INVENTION

An essential object of the present invention is to provide an X ray detecting device in which attenuation of the X rays is small so that a sufficient amount of the X rays can reach the object to be radiographed.

Another object of the present invention is to provide an X ray detecting device which is able to provide a clear radiography of an object without forming the image of the X ray detecting device in the picture even if the size of the X ray detecting device is smaller than the size of the object.

A further object of the present invention is to provide an X ray detecting device provided with a circuit arrangement which is able to generate an electric signal of enough high voltage even if the output of the X ray sensor is low.

According to the present invention there is provided an X ray detecting device which comprises XL converting means for receiving X rays and radiating visible light the intensity of which light corresponds to the intensity of the received X rays.

LE converting means for receiving the light generated from said XL converting means and generating electrical signal corresponding to the intensity of the visible light, said LE converting means comprising a base layer and amorphous semiconductor light to electric converting layer formed on said substrate and electrode means for deriving the electric signal, said LE converting means being made not to substantially absorb the X rays.

BRIEF EXPLANATION OF THE DRAWINGS

FIG. 18 is a graph showing an operation of the circuit shown in FIG. 17, and FIGS. 19 to 24 are cross sectional view showing various examples of a cassette film incorporating the X ray detecting device.

DETAILED DESCRIPTION OF THE PREFERRED EMBODIMENTS

Figure 1:
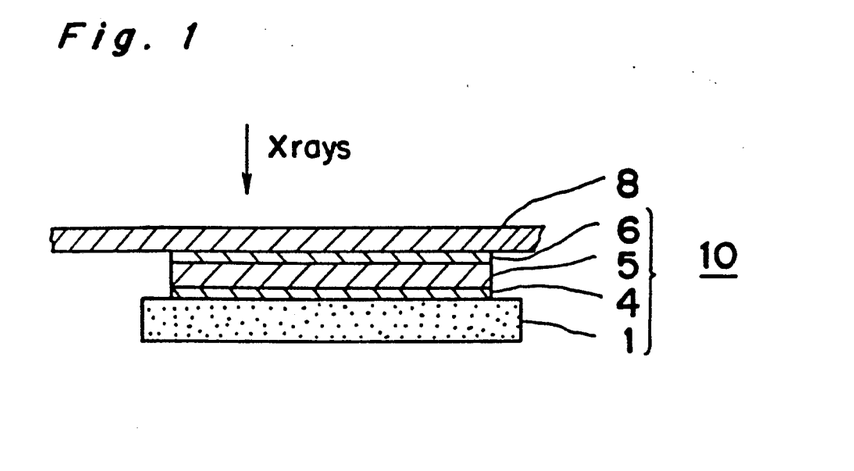
FIG. 1 is a side view of an embodiment of a X ray detecting device according to the present invention.

Referring to FIG. 1, there is shown a substrate 1 of a rectangular shape made of X ray permeable and mechanically strong material such as polyimide film of a uniform thickness. The thickness of the substrate 1 may be selected between 25 $\mu$m to 50 $\mu$m. A metal electrode 4 of 1000 angstroms (0.1 $\mu$m) thick is formed on the top surface of the substrate 1. The metal electrode 4 is made of Al, Cr or Ag and has a shape similar to that of the substrate but is somewhat smaller than the substrate 1. A LE converting layer 5 of a p-i-n type semiconductor material using amorphous polysilicon for converting light to electrical (referred to as LE hereinafter) signal is formed on the top surface of the metal electrode 4 a thickness of 10,000 angstroms. A (1 $\mu$m) transparent electrical conducting layer 6 made of indium titanium oxide (ITO) material, $SnO_2$ or ZnO is formed on the top surface of the LE converting layer 5 so as fully to cover the layer 5. The assembly by the components 1, 4, 5 and 6 provides a light to electrical converting unit 10.

An X-ray to light converting layer (XL converting layer) 8 is formed on the conducting layer 6 having an area greater than the LE converting unit 10 is formed on the top surface of the electrical conducting layer 6.

All of the members mentioned above are made of an X ray permeable material so that the x-rays can pass through the device shown in FIG. 1 with minimal X ray absorption.

In the arrangement shown in FIG. 1, when X rays are projected onto XL converting unit 8, the X rays projected on the XL converting unit 8 are converted to visible light, which is radiated to the LE converting layer 5 passing through the electrical conducting layer 6. The light radiated onto the LE converting unit 10 causes the LE converting unit 10 to generate a voltage between the metal electrode 4 and transparent electrode 6. Therefore, it is possible to measure the amount of the intensity of the X rays by measuring the voltage between the transparent electrode layer 6 and the metal electrode 4.

Figure 2:
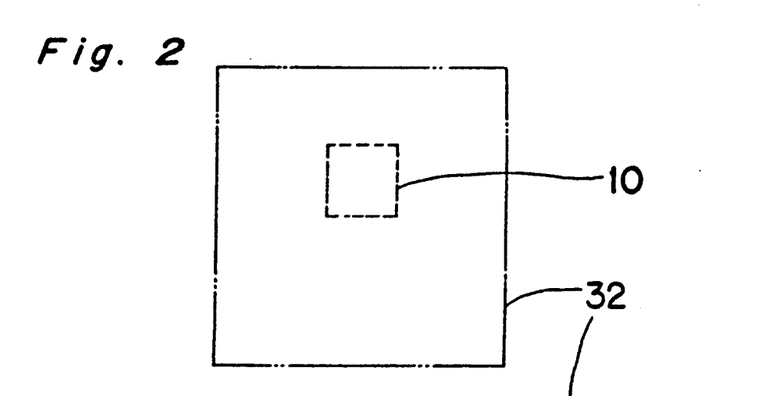
FIGS. 2 and 3 are respectively plan views showing various examples of the X ray detecting device according to the present invention.
Figure 3:
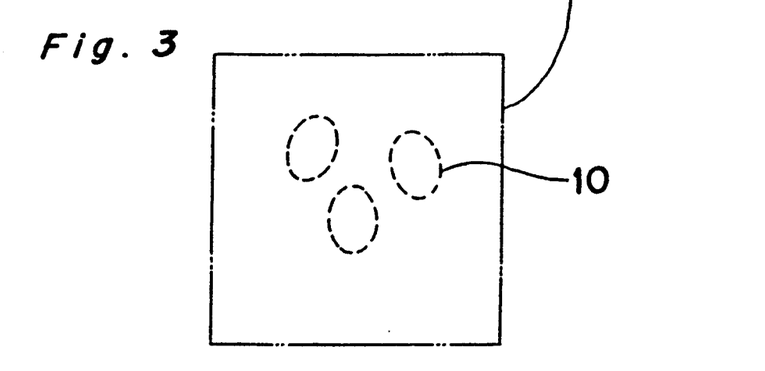

In order to take a picture of a patient using the X ray detecting device mentioned above, the X ray detecting device is disposed in the range of the X ray radiation between the patient and the X ray generating device. In the X ray detecting device of the above embodiment using the polyimide film as the substrate 1 of the LE converting unit 10, the X rays can pass the LE converting unit with minimal absorption of the X rays, the image of the LE converting unit does not appear in the radiography. Accordingly, it is not necessary to provide a LE converting unit having almost the same size of the object as used in the prior art. For example, when the X ray detecting device of the present invention is used, the size of the LE converting unit is small in size as depicted in the dotted lines in FIG. 2, which is smaller than the area 32 of the object to be radiographed shown in the chain lines in FIG. 2. Since the image of the LE converting unit does not appear on the picture of the X ray radiography, it is possible to place the X ray detecting device according to the present invention anywhere desired and further it is possible to use various configuration of the device as shown in dotted lines in FIG. 3.

However, since the XL converting unit 8 may absorb the X rays more or less for converting the X rays to visible light, there may appear the image of the XL converting unit on a radiography picture, it is necessary to make the XL converting unit larger or the same size of the area to be radiographed. This means that the LE converting unit is smaller than the XL converting unit in the plane geometrical shape.

It is noted that the Al equivalent of the LE converting unit is made desirably less than 1 and preferably less than 0.5.

Figure 4:
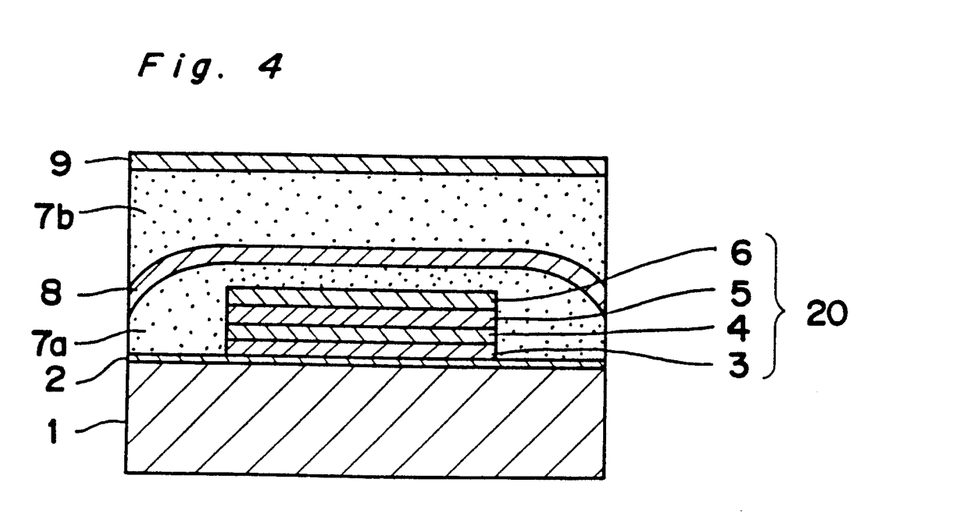
FIG. 4 is a cross sectional view showing another embodiment of the X ray detecting device according to the present invention.

Referring to FIG. 4, there is shown a substrate 1 of a rectangular shape made of X ray permeable material such as composite material of carbon fibers and epoxy resin with 350 mm square wide and 0.4 mm thick. A thin shielding film 2 made of aluminum is formed on the surface of the substrate 1 of about 17 $\mu$m thick for reflecting light generated in a XL converting unit 8 the details of which will be described later and for shielding external electrical noise.

A base film 3 made of polyimide film is formed on a central portion of the Al thin film 2 of 125 $\mu$m thick and 125 mm square wide. A lower electrode 4 of 1,000 angstroms (0.1 $\mu$m) is formed on the top surface of the base film 3 made of a layer of Al on a layer of Cr by way of vacuum deposition technique with the same area of the base film 3. A LE converting layer 5 of a p-i-n type semiconductor material using amorphous polysilicon for converting light to electrical signal is formed on the top surface of the lower electrode 4 with a thickness of 10,000 angstroms (1 $\mu$m) by way of a glow discharge method. A transparent electrical conducting layer 6 made of indium titanium oxide (ITO) material is formed on the top surface of the LE converting layer 5 so as fully to cover the layer 5. The components 3, 4, 5 and 6 provide a light to electrical converting unit 20 and is secured on the central portion of the Al thin film 2 by adhesive agent. The LE converting unit 20 is fully covered by a sealing film 7a made of light permeable, moisture proof and adhesive material with a thickness of about 0.2 mm so that the LE converting unit 20 is fully sealed from the outside atmosphere. The sealing film is made of, for example, ethylene vinyl acetate material.

An X ray to light converting layer (XL converting layer) 8 is formed on the sealing film 7a with an area similar to the area of the substrate 1 so as to fully cover the upper surface of the LE converting unit 20. The XL converting unit 8 is made by coating fluorescent member of $Cd_2O_2S$: Tb material on a transparent paper or plastic resin film. A further sealing film 7b made of light permeable, moisture proof and adhesive material is formed on the XL converting layer 8 and a Tedler film 9 (fluorine resin with Al inserted material) is formed on the further sealing film 7b so that they are formed in parallel with the top surface of the LE converting layer 5 or the surface of the substrate 1.

It is desired that the base film 3 made of polyimide film is in a range of 25 $\mu$m to 150 $\mu$m thick.

As the material of the base film 3, there may be used polyethylenetelephthalate film, polyethylenenaphthalate film, aromatic polyester film, aromatic polyamide film, polysulfon film, polyimide film, polyacrylate film, polyacetylene type film, polythiazole type film, polyphenylene type film, ethylene tetrafluoride resin film and graphite type film.

In the arrangement shown in FIG. 4, when the X rays are projected onto the bottom surface of the substrate 1 which is the surface opposite to the Al thin film 2, the X rays can pass through the device shown in FIG. 4 from the substrate 1 to the Tedler film 9 passing the substrate 1, Al thin film 2, LE converting unit 20, sealing films 7a and 7b and XL converting unit 8 with minimal absorption of the X rays. The X rays projected on the XL converting unit 8 are converted to visible light, which is radiated to the LE converting layer 5 passing both of the sealing films 7a and 7b. The light radiated toward the Tedler film 9 is reflected by the Al film laminated with the Tedler film 9 and directed to the LE converting unit 20, while the light which is not directly projected onto the LE converting unit 20 is reflected by the Al film 2 reaching the LE converting unit 20, then the light is converted into an electric signal. In the manner as mentioned above, the LE converting unit 20 generates a voltage proportional to the intensity of the X rays and voltage can be generated across the transparent electrode layer 6 and the lower electrode 4, so that it is possible to measure the amount of the intensity of the X rays by measuring the voltage between the transparent electrode layer 6 and the lower electrode 4.

In the embodiment mentioned above, the lower electrode 4 is made of a layer of Al on a layer of Cr in place of the above material, there may be used Al, Ag, Cr, Al/Ag alloy or Cr/Ag alloy. As the transparent, moisture proof and adhesive material for the sealing films 7a and 7b, polyvinylbutyral (PVB) may be used in place of EVA. The XL converting unit 8 may be formed of $CaWO_4$, BaF Cl: Eu may be used. The further sealing film 7b may be formed between the substrate 1 and shielding film 2, or may be formed between the substrate 1 and Al light thin film 2, and/or the Al thin film 2 and the polyimide base film 2, or between the Al film 2 and the polyimide film layer 3.

As mentioned above, since the X ray detecting device in the above embodiment is formed to pass the X rays without attenuation of the X rays using a mechanical strong material such as carbon fiber including material as the substrate 1, the X ray detecting device can be formed thin and light assuring a similar mechanical strength of the conventional device. In addition, by sealing the LE converting unit with the transparent, moisture proof bonding material so as to prevent contact with the ambient atmosphere, it is possible to prevent deterioration of the function of the device due to the absorption of the humidity, whereby the life of the X ray detecting device can be extended. Also it is possible to decrease the noise of the X ray detecting device by sealing the LE converting unit by the Al thin film, so that error of the X ray detecting device can be decreased.

It is noted that as the base film 3, there may be used various other X ray permeable material such as plastic resin layer or SUS (stainless steel sheet) or glass plate which are sufficiently thin to pass the X rays.

Referring to FIGS. 5 to 8, the substrate 1 made of a polyimide film of 50 μm thick has an area smaller than the area 32 (shown by chain lines in FIG. 5) to be radiographed. The lower electrode 4 made of Al of 50 to 10,000 angstrom thickness is formed on the substrate 1. With the thickness of the lower electrode 4 mentioned above, the work is easy and the X rays are permeable, and in addition, the resistance of the lead is low. The plane view of the lower electrode 4 has a rectangular main portion 4a on which the LE converting unit is placed and a lead conductor 4b extending from one edge of the main portion 4a to one side 1a of the substrate 1 with a narrow width 4c. The lead conductor 4b is made of the same material as that of the main portion 4a. The LE converting layer 5 made of amorphous silicon of p-i-n type semiconductor active layer is formed on the main portion 4a of the lower electrode 4 with a uniform thickness of 1 μm. The transparent electrode 6 made of $SnO_2$ is formed on the top surface of the LE converting layer 5 with 1,000 angstrom (0.1 μm) thickness. The main portion 6a of the transparent electrode 6 extends toward the side 1a by means of an elongated conductor 6b on the top surface of the substrate 1 in parallel with, but electrically insulated from, the lead conductor 4b. The size of the main portion 6a and conductor 6b of the transparent electrode 6 is almost the same as that of the main portion 4a and lead conductor 4b of the lower electrode 4. The main portions 4a and 6a of the respective electrodes 4 and 6 substantially oriented in the vertical relation. The conductors 4b and 6b may be 500 to 10,000 angstroms (0.05 to 1 μm) thick.

In the embodiment shown, although the lead conductor 6b is formed integral with the main portion 6a, they may be separately manufactured and connected after they are fabricated and placed on the positions shown. Also, it is possible to make the main portion 4a and the lead conductor 4b separately, thereafter they can be connected. It is also possible to make the main portion 4a or 6a and conductor 4b or 6b of the lower electrode 4 or transparent electrode 6 of different materials. In order to allow for passing of the light, it is desired that the electrode 6 is thinner. However, the thinner the electrode, the higher the resistance of the electrode as the lead conductor becomes. From this point of view it is desired to use Al thin film as the conductor 6b. The XL converting unit 8 made of ZnS is formed on the transparent electrode 6. The XL converting unit 8 has an area similar to the area to be radiographed.

Figure 5:
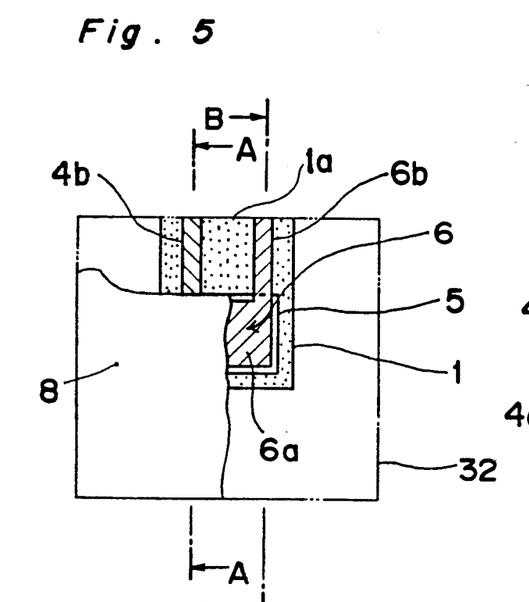
FIG. 5 is a plan view showing an embodiment of the X ray detecting device with lead conductors according to the present invention.
Figure 6:
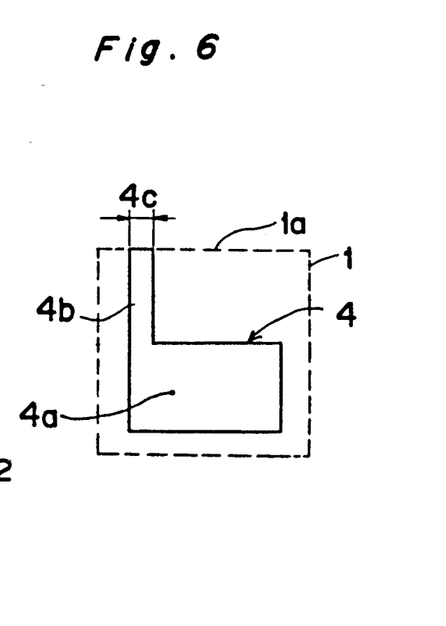
FIG. 6 is a plan view showing a LE converter used in the embodiment shown in FIG. 5.
Figure 7:
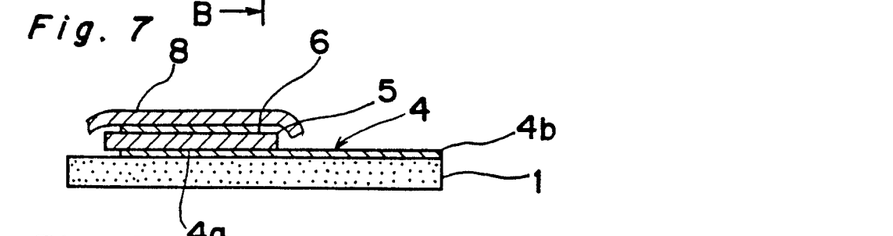
FIG. 7 is a cross sectional view taken along the lines A—A in FIG. 5.
Figure 8:
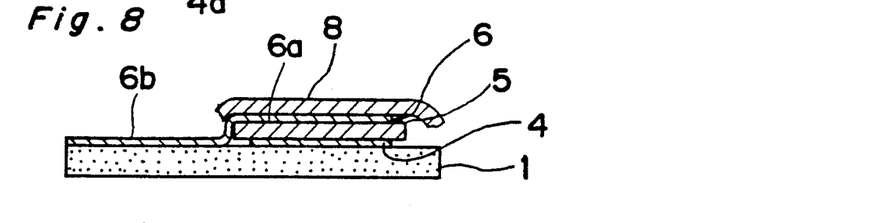
FIG. 8 is a cross sectional view taken along the lines B—B in FIG. 5.

The arrangement mentioned above is positioned in such a manner that the side 1a of the substrate 1 is oriented with the side of the area to be radiographed or the side 1a is outside of the radiographed area but the main portion 4a is inside the radiographed area.

Under such a condition, when the X rays are radiated onto the XL converting unit 8, the X rays are converted into visible light, which reaches the LE converting layer 5 through the transparent electrode 6. The LE converting layer 5 generates voltage corresponding to the intensity of the X rays across the lower electrode 4 and transparent electrode 6. The voltage generated across the electrodes 4 and 6 are derived from the conductors 4b and 6b. In the embodiment shown in FIGS. 5 to 8, since the ends of the conductors 4b and 6b can be placed out of the area to be radiographed, undesired image of connections at the conductors 4b and 6b such as the image of the solders for connecting the external wires and conductors 4b and 6b does not appear in the picture of the radiograph.

Figure 9:
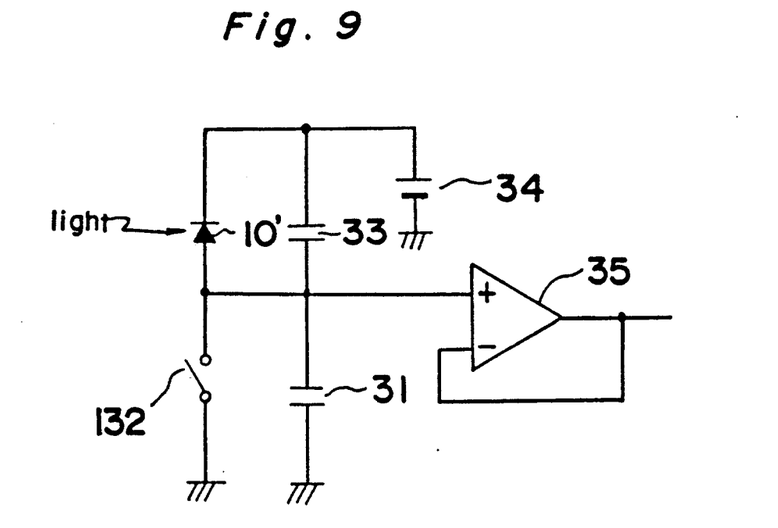
FIG. 9 is a circuit diagram of one example of the X ray detecting device according to the present invention.

FIG. 9 shows an example of a light measurement circuit for the X ray detecting device as shown in the embodiments mentioned above. The circuit arrangement shown in FIG. 9 may be connected to the various X ray detecting device mentioned already. However, in this embodiment, explanation is made in the case where the circuit arrangement is connected with another X ray detecting device shown in FIG. 10 in which the LE converter unit 10 or 20 is placed on the substrate 1 through a XL converting layer 8'.

The XL converting layer 8' is a fluorescent layer made of mixture in which fluorescent material such as $CaWO_4$ or $Gd_2O_2S$: Tb is mixed in heat hardenable resin of phenol epoxy resin system. The transparent electrode film or lower electrode 4 made of $In_2O_3$ is formed on the XL convering unit 8' by way of vacuum deposition. The LE converting layer 5 formed on the lower electrode 4 is a p-i-n semiconductor diode made of amorphous silicon of 6,000 angstrom (0.6 μm) thickness. Formed on the LE converting layer 5 is an upper electrode 6' made of Al or Cr with 1,000 angstrom (0.1 μm) thickness. The size of the substrate of the device shown in FIG. 10 is about 45 cm×45 cm.

Figure 10:
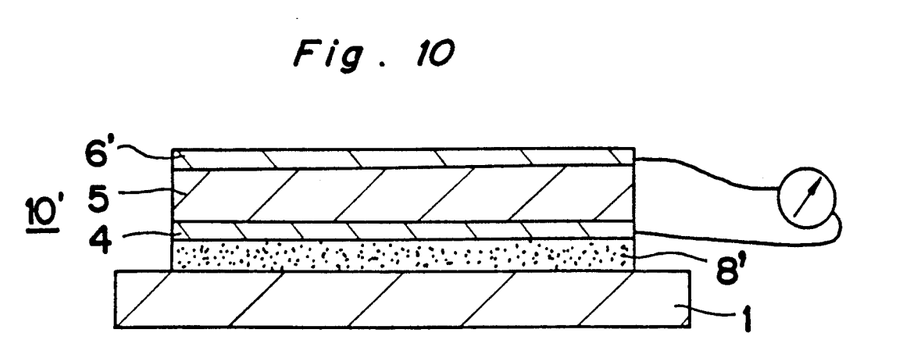
FIG. 10 is an example of the X ray detecting device used with the circuit shown in FIG. 9.

In the device shown in FIG. 10, the incident X rays reach the XL converting unit 8' through the LE converting unit 10' and the X rays are converted into visible light therein and the visible light is converted into an electrical signal in the LE converting unit 10' and voltage corresponding to the intensity of the X rays can be obtained across the electrodes 4 and 6'. The LE converting layer 5 includes a plurality of hetero junction layers, one of which is made of amorphous silicon carbide containing III or V atoms. The mixture rate of the carbon in the amorphous silicon carbide is less than 0.6 and more than 0.05 against the silicon atoms. The LE converting layer 5 is a diode made of p type semiconductor of amorphous silicon carbide, i type semiconductor of amorphous silicon and n type semiconductor amorphous silicon, so that a high light to electric conversion efficiency can be obtained.

Referring to FIG. 9, the diode 10' formed by the electrodes 4 and 6' and the LE converting layer 5 has its anode connected to the ground through a capacitor 31 and a manually operable switch /32 for shortcircuiting the capacitor 31. The anode of the diode 10' is further connected to the non inverted input terminal +of an operational amplifier 35 for converting the current to voltage. A capacitor 33 connected to the diode 10 shows an equivalent capacitor or stray capacitor of the diode 10'. The cathode of the diode 10' is connected to the negative terminal of a D.C. power source 34 having its positive terminal grounded.

In the circuit arrangement mentioned above, after the switch /32 is turned on for a given period to shortcircuit the capacitor 31, the switch /32 is turned off. When no X rays are radiated onto the X ray detecting device, the output voltage Voo of the amplifier 35 is $$V_{oo} = E \times C1/(C1+C2),$$

wherein E is the voltage of the power source, C1 and C2 are capacitances of the respective capacitors 33 and 31. When the current flows through the capacitor 31 upon receipt of the X rays, the current i is integrated by the capacitor 31 and the integrated value is amplified by the amplifier 35, the output voltage Vol of which is expressed as $$V_o \text{-} 1/C \int i \times dt$$

wherein C is C1/(C1+C2).

In the conventional X ray detecting circuit, since the capacitance of the LE converting unit is large, there has occurred noise and the response of the amplifier has been slow. For example, in the conventional X ray detecting circuit, as when the amplifier 13 nV/√Hz is used with R=330 KΩ and C=1.1 μF, noise of 10 mV p-p has been generated. However, according to the present embodimet shown in FIG. 9, noise can be decreased to −40 dB from the noise of the prior art detecting device.

Figure 11:
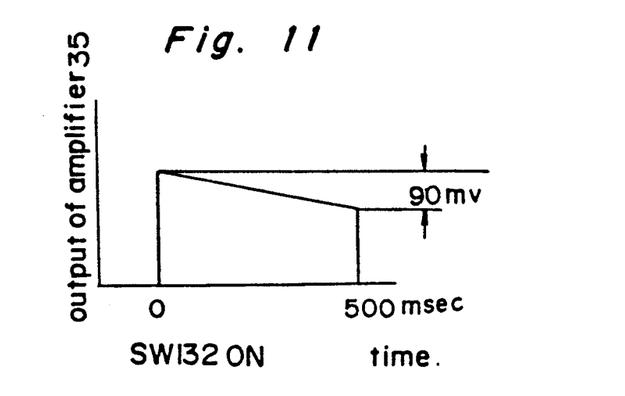
FIG. 11 is a graph showing an operation of the circuit shown in FIG. 9.

In the example test of the present embodiment, the capacitance C2 of the capacitor 31 was 100 pF and the diode 10' was 80 mm² a-Si pin diode structure with E=2 V. As the amplifier 35, a low bias voltage and low drift type having FET input stage was used. Using the diode 10' which could generate 0.2 μA of small output, 90 millivolts could be obtained from the amplifier 35 when the switch was turned off after 500 milliseconds from the turn on of the switch 12 as shown in FIG. 11. Thus it is apparent that the amplifier according to the present invention can sufficiently amplify the very low output value of the X ray detecting device.

Figure 12:
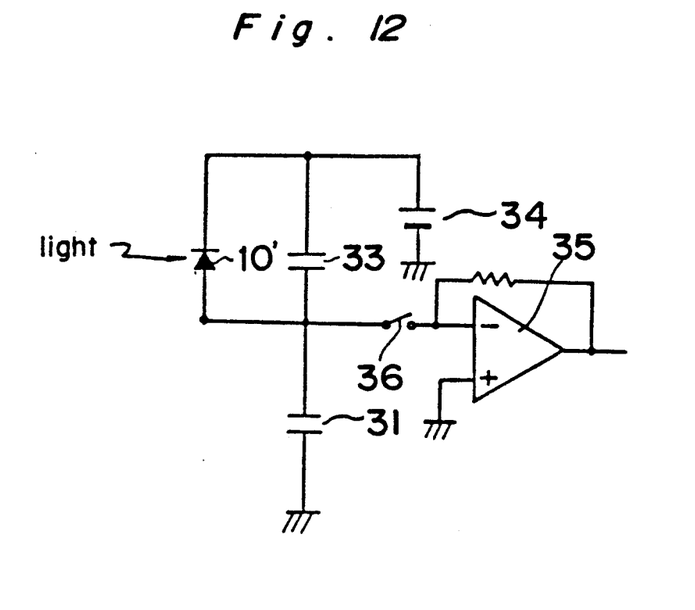
FIG. 12 is a circuit diagram showing another example of the circuit for use with the X ray detecting device.
Figure 13:
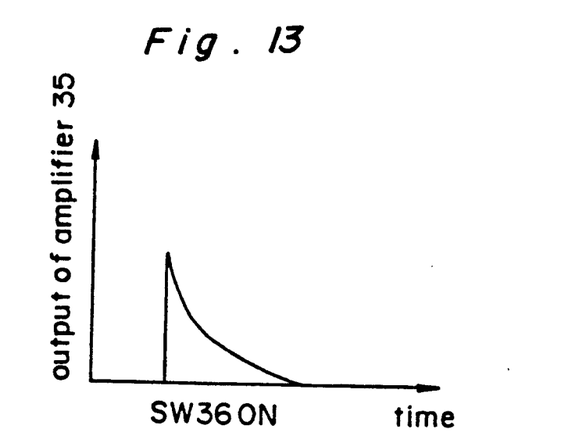
FIG. 13 is a graph showing an operation of the circuit shown in FIG. 12.

FIG. 12 shows another example of the X ray detection circuit in which the switch 36 is connected between the anode of the diode 10 and the input terminal of the amplifier 35. The switch /32 in FIG. 9 is omitted. When the switch 36 is turned on, the charge stored in the capacitor 31 is converted to the voltage, being amplified by the amplifier 35. The output voltage is shown in FIG. 13. According to the embodiments of the X ray detecting circuit shown in FIGS. 9 and 12, there can be obtained a high speed and low noise detecting circuit since the charge of the capacitor 31 serially connected to the diode 10 of the X ray detecting device can be directly measured.

Figure 14:
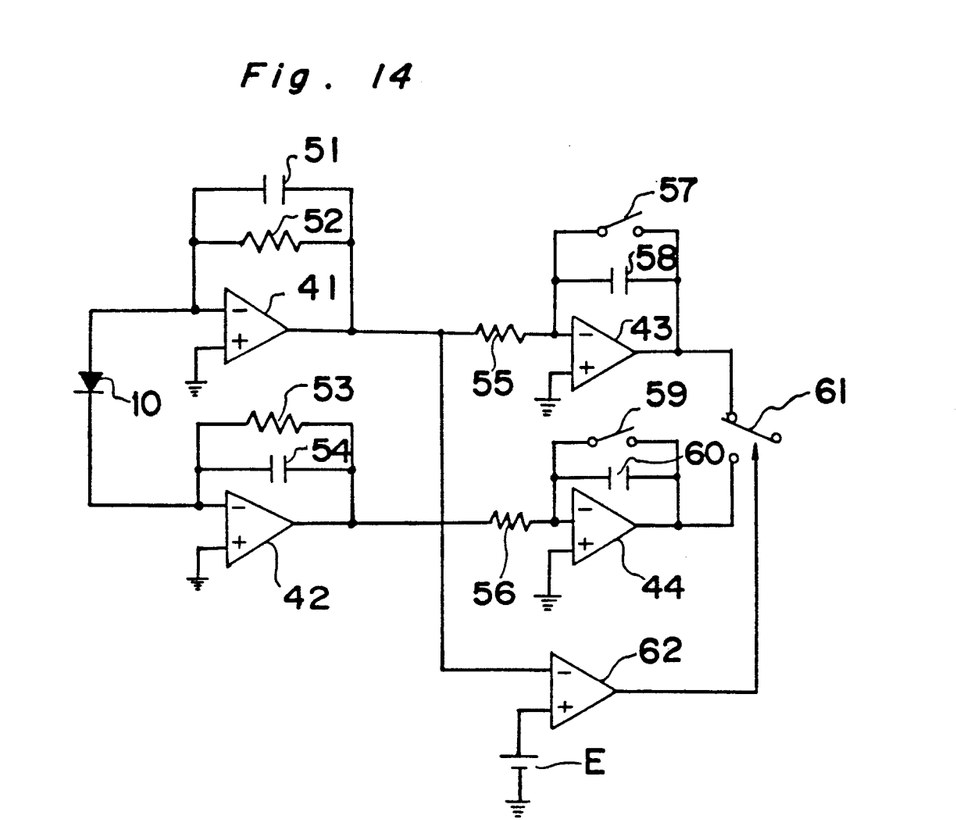
FIG. 14 is a circuit diagram showing a further example of the circuit for use with the X ray detecting device.

Referring to FIG. 14 showing a further example of the X ray detecting circuit, the diode 10 has its anode and cathode connected to input terminals of amplifiers 41 and 42, the output of which are connected to amplifiers 43 and 44 through resistors 55 and 56 respectively. A parallel circuit of a capacitor 51 and a resistor 52 for determining the response speed is connected between the output terminal and input terminal of the amplifier 41. A parallel circuit of a capacitor 54 and a resistor 53 for determining the response speed is connected between the output terminal and input terminal of the amplifier 42. A parallel circuit of a capacitor 58 and a manually operable switch 57 is connected between the input and output of the amplifier 43. A parallel circuit of a capacitor 60 and a manually operable switch 59 is connected between the input and output of the amplifier 44. The output terminals of the amplifiers 43 and 44 are connected to a switch 61 operable by the output signal of a comparator 62 which compares the output of the amplifier 41 and a reference voltage E.

Figure 15:
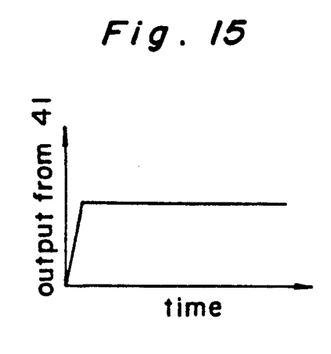
FIGS. 15 and 16 are graphs showing operation of the circuit shown in FIG. 14.
Figure 16:
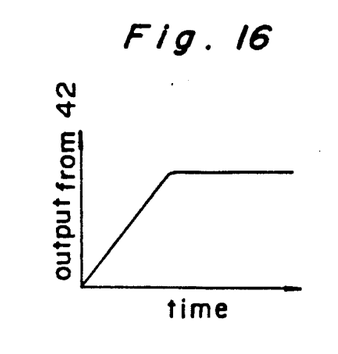

It is noted that the response speed of the amplifier 41 is faster than that of amplifier 42 as shown in FIGS. 15 and 16 and the gain of the amplifier 42 is higher than that of the amplifier 41. It is assumed that the resistance of the resistors 52, 53, 55 and 56 are expressed as R52, R53, R55 and R56 and the capacitance of the capacitors 58 and 60 are expressed as C58 and C60. It is further assumed the resistance R52=R53, C58=C60. If R52 is not equal to R53, R52/R55×C 58=R53/R56×C60. When the X ray detecting device shown in FIG. 10 receives X rays, the output of the diode 10 is applied to the amplifiers 41 and 42 and amplified therein. When the output voltage of the amplifier 41 is higher than the level of the reference voltage E, that is the level of the X rays is high, the comparator 62 causes the switch 61 to be switched toward the amplifier 43, so as to amplify the output of the diode 10 with a high response speed and low gain.

In the reversed case, that is the intensity of the X rays is low and the output of the amplifier 41 is lower than the reference voltage E, the switch 61 is switched to the amplifier 44, so that the low level output of the diode 10 is amplified by the high gain amplifiers 42 and 44 with relatively low response speed with low noise, whereby it is possible to amplify the low output of the X ray signal under a good S/N ratio and an accurate detection of the X rays can be made.

As mentioned above, since two amplifying systems of high gain of low response speed and low gain of high response speed can be switched automatically corresponding to the output level of the X ray detecting device, it is possible to detect the X rays over a wide level range.

Figure 17:
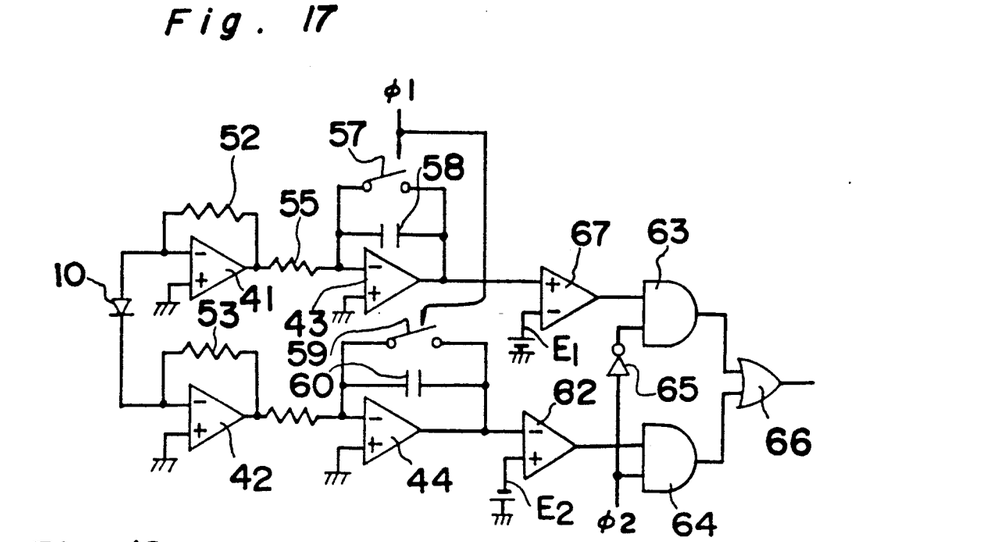
FIG. 17 is a circuit diagram showing a further example of the circuit for use with the X ray detecting device.
Figure 18:
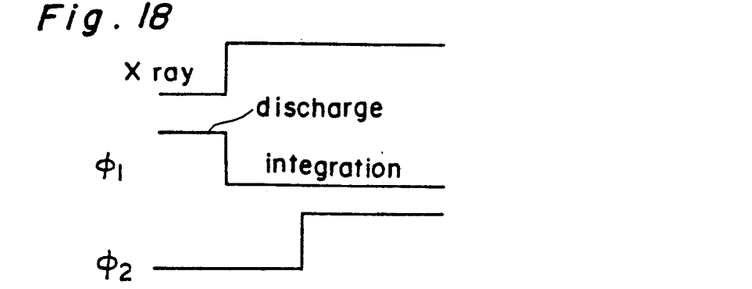

Referring to FIG. 17 showing another example of the X ray detecting circuit in which like parts are designated by like reference numerals and the description of the parts are herein omitted. The output terminals of the amplifiers 43 and 44 are connected to comparators 61 and 62, the outputs of which are connected to respective one input terminals of AND gates 63 and 64. Another input terminal of the AND gate 64 is applied with a signal φ2 and another input terminal of the AND gate 63 is applied with the reversed φ2 signal through an inverter 65. The switches 57 and 59 are operated by the signal φ1 which is the reversed signal which is generated when the X rays are received. The comparators 67 and 62 are respectively supplied with reference signals E1 and E2 which may be equal to each other.

In operation, when the level of the X rays is low, the comparator 61 generates an output and when the reversed signal of the signal φ2 becomes high, X ray detection signal can be obtained through the AND gate 63 and an OR gate 66. On the other hand, when the level of the X rays is high, the comparator 62 generates an output and when the signal φ2 is high, the X ray detection signal can be obtained through the AND gate 64 and the OR gate 66. The switches 57 and 59 are turned on by the signal φ1 respectively when the X rays are absent, the capacitors 58 and 60 are reset.

It is noted that the level of the output signals of the respective series of the amplifiers may be adjusted by the time constant of the integration circuits in case the time constant and/or gain of the amplifier means is different between the two series.

Figure 19:
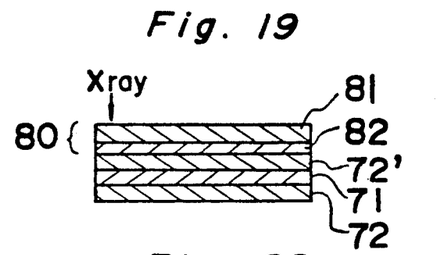

FIG. 19 shows an example of the application of the X ray detecting device according to the present invention, in which a X ray film cassette is integrated with the X ray detecting device in one body.

Referring to FIG. 19, 71 denotes a photographic film of a rectangular planner shape which can sense the visible light. The X ray film 71 is sandwiched by a pair of X ray to visible light converting papers 72 and 72' (referred to as XL converting paper hereinafter). The arrangement of the X ray film 71 and the XL converting papers 72 and 72' is the same as the X ray film cassette known in the prior art, the detail thereof is herein omitted.

An X ray detecting device 80 according to the present invention is laminated on the top surface of the XL converting paper 72'. As the X ray detecting device, there may be used various devices as shown in the embodiments already mentioned above in the present invention.

However, in the example shown in FIG. 19, the X ray detecting device is composed of a XL converting paper 81 and LE converting unit 82.

Figure 20:
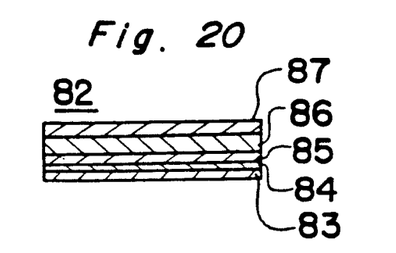

As the LE converting unit 82, an amorphous silicon LE converting element is preferably used. The specific structure of the LE converting element unit 82 is shown in FIG. 20, in which on the surface of a glass substrate 83, a TCO layer 84 is formed. An amorphous silicon layer 85 (referred to as a-si pin layer hereinafter) is formed on the TCO layer 84. A metal layer 86 is formed on the a-si pin layer 85 and the metal layer 86 is covered by a protection layer 87. It is desired to shape the LE converting unit 82 corresponding to the shape of the area to be radiographed. For example, in order to measure the intensity of the X rays of the object area such as stomach or cancer, it is desired to provide the LE converting unit only in the area to be detected. When the LE converting unit using the amorphous silicon is used, it is possible to shape the LE converting unit as desired.

The TCO layer 84 is formed using ITO (indium titanium oxide) or $SnO_2$ by way of sputtering method, resistance heating deposit method, or EB (electron beam) deposit method, with 300 to 1,000 angstrom (0.03 to 0.1 μm) thickness.

The a-si pin layer 85 is formed by preferably a parallel plate plasma CVD method with 5,000 to 15,000 angstrom (0.5 to 1.5 μm) thickness. The metal layer 86 is formed using Al, Ag, Cr, or B SUS, Cu. Au in a manner similar to the way of making the TCO layer with 500 to 10,000 angstrom (0.05 to 1.0 μm) thickness. The protection layer 87 is formed using plastic synthetic resin such as epoxy resin, or phenal resin, by a screen printing, roll coating, or brush painting with 1 to 10 μm thickness. It is possible to laminate a number of synthetic resin layers.

In the arrangemt mentioned above, the LE converting unit is placed in such a manner that the glass 83 faces the XL converting paper 81 and the arrangement mentioned above is put on the XL converting paper 72'. In the X ray detecting device mentioned above, when the X rays come into the X ray detecting device from above, the X rays reaches the XL converting paper 81 and the fluorescent contained in the XL converting paper 81 is excited by the X rays and generates visible light, which radiates the LE converting unit 82, so that an electric output corresponding to the intensity of the X rays can be generated from the LE converting unit 82. The X rays pass the LE converting unit 80 and reach the XL converting papers 72 and 72' through the film 71. The X rays are converted into visible light by the XL converting papers 72 and 72' and the light thus converted is radiated to the photographic film which senses the visible light. Thus, the X ray image of the object can be photographed by the film 71.

Figure 21:
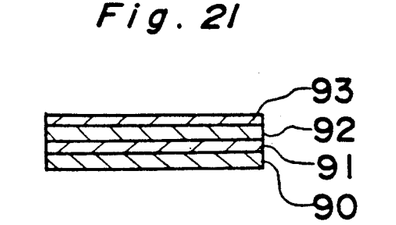

The LE converting unit 82 may be formed in such a manner as in FIG. 21 that a metal layer 91 made of Al or Cr is formed on a film layer 90 and a-si pin layer 92 is formed on the metal layer 91, and further a TCO layer 93 is formed on the a-si pin layer 92. In this arrangement, the film layer 90 is laid on the XL converting paper 72' of the device shown in FIG. 19.

Figure 22:
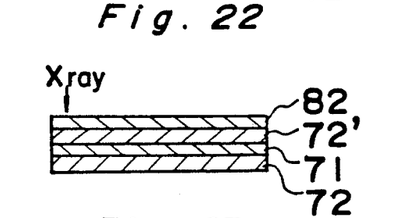

FIG. 22 shows a modification of the device shown in FIG. 19, wherein the top and bottom of the LE converting unit 82 shown in FIG. 20 is reversed and put on the XL converting paper 72' eliminating the XL converting paper 81. In this case, the XL converting paper 72' must radiate the visible light on both surfaces.

Figure 23:
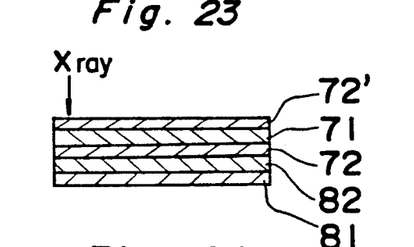
Figure 24:
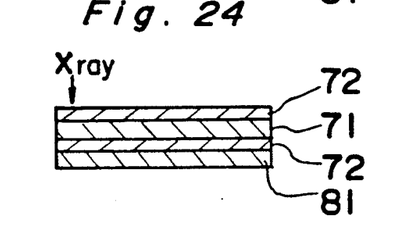

If the absorption of the X rays in the LE converting unit 82 is high and if glass is used in the LE converting unit, the X rays are attenuated when the X rays reach the object to be radiographed. In order to prevent this drawback, it is desired to dispose the X ray detecting device at the side after the X rays pass the photographic film. FIGS. 23 and 24 show the examples for this purpose. By the arrangement shown in FIGS. 23 and 24, it is possible to prevent the drawback wherein the edge portions of the glass plate used in the LE converting unit appear in the picture of the radiograph.

It is noted that in FIGS. 19 to 24, X ray film cassette, cushioning members for resiliently supporting the photographic film and a lid plate for interrupting the X rays are omitted but they are used in a manner similar to the known manner.

What is claimed is:

1. An X ray detecting device for placement between an X ray source and an object to be measured or an X ray photographic film comprising:
    XL converting means for receiving X rays and generating visible light, the intensity of the generated visible light corresponding to the intensity of the received X rays, and
    LE converting means for receiving the light generated from said XL converting means and generating an electrical signal corresponding to the intensity of the visible light, said LE converting means comprising a base layer, an amorphous semiconductor light to electric converting layer, and electrode means for deriving the electric signal, said LE converting means being made not to substantially absorb the X rays.

2. The X ray detecting device according to claim 1, wherein Al equivalent of said LE converting means is smaller than 1.

3. The X ray detecting device according to claim 1, wherein said base layer of said LE converting means is made of a heat resistive synthetic resin film.

4. The X ray detecting device according to claim 3, wherein said heat resistive synthetic film is a polyimide film.

5. The X ray detecting device according to claim 1, wherein said device further comprises conductor means formed on said base layer for extending from said electrode means to an area to be photographed, said conductor means being thin sufficiently in thickness for allowing the passing of the X rays.

6. The X ray detecting device according to claim 5, wherein said conductor means is 500 to 10,000 angstroms (0.05 to 1.00 μm) thick.

7. The X ray detecting device according to claim 1, wherein the base layer is made of a polyimide film 25 to 150 μm thick.

8. The X ray detecting device according to claim 1, wherein the area of said LE converting means is smaller than the area to be radiographed.

9. The X ray detecting device according to claim 1, wherein an Al equivalent of said LE converting means is smaller than 0.5.

10. The X ray detecting device of claim 1, further comprising a fluorine-containing resin film which includes Al and more than one sealing film made of a light permeable and moisture proof adhesive.

11. The X ray detecting device according to claim 10, wherein each of said more than one sealing film is made of polyvinylbutyral or ethylenevinylacetate.

12. The X ray detecting device of claim 1, wherein said XL converting means permits passage of X rays therethrough with minimal absorption of the X rays.

13. An X ray detecting device for placement between an X ray source and an object to be measured or an X ray photographic film comprising:
XL converting means for receiving X rays and generating visible light, the intensity of the generated visible light corresponding to the intensity of the received X rays,
LE converting means for receiving the light generated from said XL converting means and generating an electrical signal corresponding to the intensity of the visible light, said LE converting means comprising a base layer, an amorphous semiconductor light to electric converting layer, and electrode means for deriving the electric signal, said LE converting means being made not to substantially absorb the X rays,
two amplifier means provided for the electrode means, each of said amplifier means comprising an integration circuit, and
selecting means for selecting any one of said amplifier means corresponding to the range of the intensity of the X rays to be detected.

14. The X ray detecting device according to claim 13, wherein the level of the output signals of the two amplifier means is adjusted by the time constant of the integration circuits when either the time constant or gain is different between the two amplifier means.

15. The X ray detecting device according to claim 13, wherein said selecting means operates by the output of the two amplifier means.

16. The X ray detecting device according to claim 13, wherein said selecting means operates by the output of the integration circuit which integrates the signals in the two amplifier means.

17. An X ray detecting device for placement between an X ray source and an object to be measured or an X ray photographic film comprising:
an XL converting layer for receiving X rays and generating visible light, the intensity of the generated visible light corresponding to the intensity of the received X rays,
a semiconductor layer for receiving the light generated from the XL converting layer and converting the intensity of the received visible light into an electrical signal corresponding to the intensity of the received visible light, said semiconductor layer being made not to substantially absorb the X rays, and
capacitor means connected with said semiconductor layer or stray capacitor of the semiconductor layer for storing the charge across the semiconductor layer, so that the output of the X ray converting device can be generated by the charge stored in said capacitor.

18. The X ray detecting device according to claim 17, wherein said device further comprises amplifier means for amplifying the voltage across the capacitor or stray capacitor and switching means for applying the voltage across the capacitor or stray capacitor to said amplifier means.

19. The X ray detecting device according to claim 17, wherein said device further comprises a current voltage amplifier to amplify the current of the capacitor or stray capacitor for outputting a voltage signal representing the intensity of the X ray.

20. The X ray detecting device of claim 17, wherein said XL converting layer permits passage of X rays therethrough with minimal absorption of the X rays.

21. An apparatus comprising a film cassette, which includes a photographic film, integral with an X ray detecting device, said X ray detecting device comprising:
XL converting means for receiving X rays and generating visible light, the intensity of the generated visible light corresponding to the intensity of the received X rays, and
LE converting means for receiving the light generated from said XL converting means and generating an electrical signal corresponding to the intensity of the visible light, said LE converting means comprising a base layer, an amorphous semiconductor light to electric converting layer, and electrode means for deriving the electric signal, said LE converting means being made not to substantially absorb the X rays.

22. The film cassette according to claim 21, wherein said XL converting means acts as a XL converting means for projecting the light corresponding to the X ray to the photographic film.

23. The film cassette according to claim 21, wherein said X ray detecting device is disposed at a position such that the X rays first pass the photographic film.

* * * * *